(Specimens.)

C. B. MANVILLE.
PIPE COVERING AND PROCESS OF MANUFACTURING SAME.

No. 527,867. Patented Oct. 23, 1894.

Witnesses:
C. N. Keeney
Anna V. Faust

Inventor:
Charles B. Manville
By Binedier Morrell
Attorneys.

UNITED STATES PATENT OFFICE.

CHARLES B. MANVILLE, OF MILWAUKEE, WISCONSIN.

PIPE-COVERING AND PROCESS OF MANUFACTURING SAME.

SPECIFICATION forming part of Letters Patent No. 527,867, dated October 23, 1894.

Application filed March 10, 1893. Serial No. 465,460. (Specimens.)

*To all whom it may concern:*

Be it known that I, CHARLES B. MANVILLE, of Milwaukee, in the county of Milwaukee and State of Wisconsin, have invented a new and useful Improvement in Pipe-Coverings and Processes of Manufacturing Same, of which the following is a description, reference being had to the accompanying drawings, which are a part of this specification.

My invention relates to a covering adapted for inclosing a pipe or analogous article in which heat is to be conserved, the covering being adapted to prevent the transmission of heat or cold.

The invention consists in the novel method of constructing the covering, and in the covering itself and the several parts thereof or their equivalents.

Figure 1:
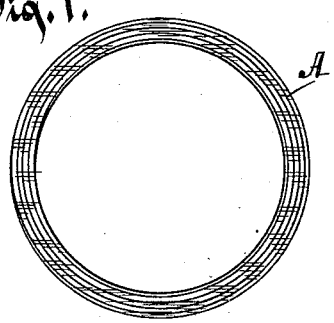
Figure 2:
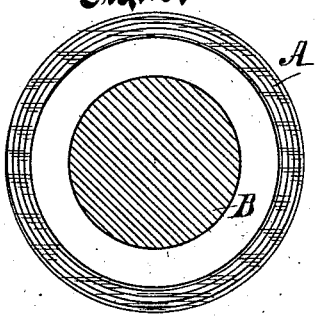
Figure 3:
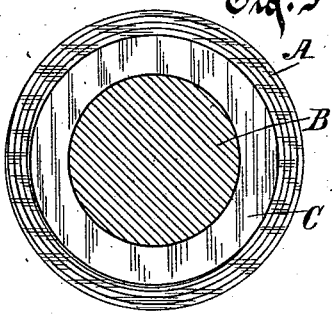
Figure 4:
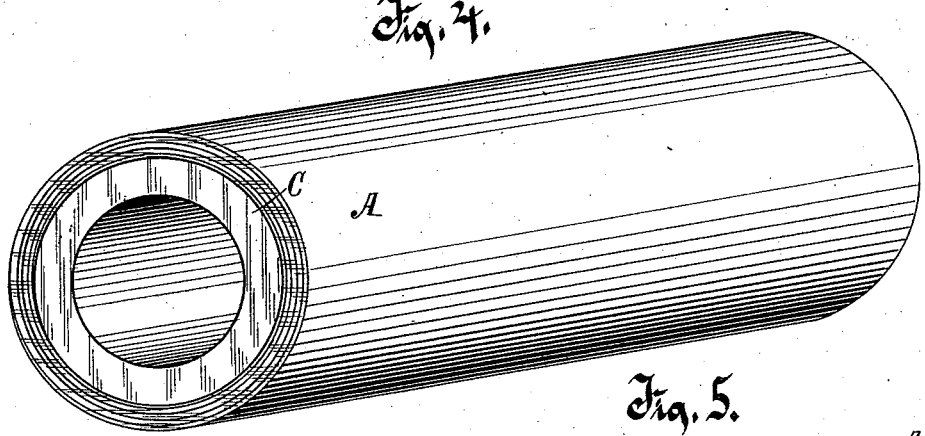
Figure 5:
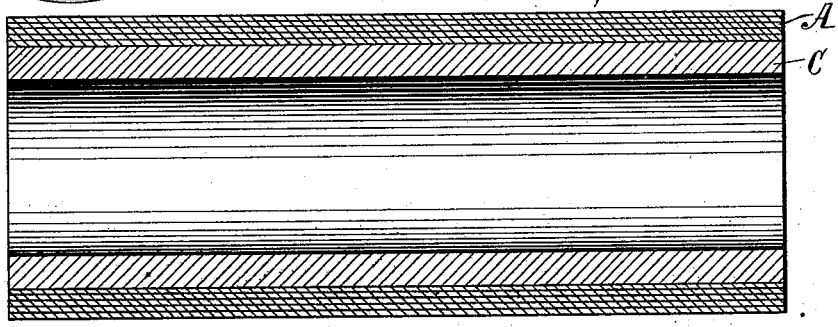
Figure 6:
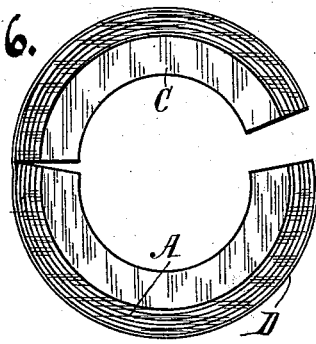

In the drawings, Figure 1, is a transverse section of the outer shell of my improved covering. Fig. 2, is a transverse section of the outer shell of my improved covering with a core placed therein, in the process of manufacture. Fig. 3, is a transverse section of the outer shell and the lining of my improved covering, with the core therein about which the lining is builded. Fig. 4, is an isometrical tubular section of my improved covering. Fig. 5, is a longitudinal segmental section of the covering, being a part of the tubular section shown in Fig. 4 cut into segmental sections lengthwise. Fig. 6, is a transverse section of the segmental parts or sections of the covering, complementary to each other, hinged together at one side and slightly separated from each other at the other side, and having a flap for securing them together.

In constructing my improved covering a sheet of wool felt or analogous fibrous material is coated on one side with paste, and is then wound upon itself about a core or mandrel, forming an outer cylindrical shell A, consisting of several layers of the felt, of suitable thickness (ordinarily one-half inch or more) to adapt it for the pipe on which it is to be used, having reference to the size of the pipe. When the paste has dried so that the layers of the felt adhere permanently to each other, the shell is removed from the mandrel, and a cylindrical core B, of less diameter than the aperture in the shell A, is inserted axially in the shell. The diameter of the core with reference to the aperture in the shell is such preferably, as to leave a space between the two of about one-half an inch, but this may be varied somewhat as desired, with reference to the conditions under which the covering is to be used, without departing from the spirit of my invention. The space between the shell A and the core B, is then filled with a supply of fire proof material C which is also substantially a non-conductor of heat, the material being for this purpose mixed with water to make it plastic, and so thin as to be readily poured into the space, portions of which, still integral with the plastic mass, enter as arms or tentacles into the spaces in the surrounding fibrous mass. In this construction the shell A serves, first for the outer wall or mold of the plastic material, and second, as the shell or outer part of the covering itself, to which, by means of the rough and porous inner surface thereof, the more fragile interior part or lining C adheres by means of its arms or tentacles, and by which shell, this inner fragile lining is supported.

The fire proof material C is preferably but not necessarily composed of kaolin and plaster of paris, with a small amount of asbestos and wool fiber, the last two being desirable to make the compound somewhat tenacious and slightly porous.

The fire proof material C when poured into its chamber, very soon sets or hardens becoming rigid, and by its arms or tentacles adhering to the shell A, and thereupon the core B is withdrawn, leaving the covering in the tubular form shown in Fig. 4.

The cover thus formed is hard and rigid, the interior earthy shell or lining especially being, from the moment it sets or hardens, entirely rigid and inflexible. To convert this into a form adapted for convenient use the tubular section is sawed in two lengthwise forming segmental sections such as are shown in Figs. 5 and 6, adapted to complement each other, and thus inclose a pipe. To complete these sections for the market, and for use, a strip of canvas D is pasted to the outer surface of the sections hinging them together at one side, and projecting from an edge of a section forming a flap adapted, when the two sections are brought together, to overlap and be pasted to the surface of the abutting section, whereby the sections are secured to each other and about the inclosed pipe. See Fig. 6.

What I claim as my invention, and desire to secure by Letters Patent, is—

1. The process of constructing non-conducting coverings for steam pipes and the like, the same consisting in first building up or forming an outer stock or hollow body of felt material, then inserting a mandrel or core centrally of said body leaving an intermediate surrounding space, then filling said space with a plastic fireproof non-conducting material and permitting such material to permanently adhere to the inner surface of the body, and finally allowing the material to set and then withdrawing the mandrel, substantially as described.

2. The process of constructing a covering for steam pipes and analogous articles, consisting of forming a sectional, annular outer shell by winding a sheet of pasted and adhesive fibrous material upon itself about a mandrel forming a hollow shell; removing the shell from the mandrel; inserting therein axially a core of less diameter than the aperture of the shell, and filling the space between the core and the outer shell with a fire proof material practically a non-conductor of heat, while in a plastic state; allowing the material to set and adhere to the fibrous shell becoming rigid thereto, and removing the core therefrom, as set forth.

3. The process of constructing a covering for steam pipes and analogous articles, consisting of forming a sectional, annular outer shell, by winding a sheet of pasted and adhesive fibrous material upon itself about a mandrel, forming a hollow shell; removing the shell from the mandrel; inserting therein axially a core of less diameter than the aperture of the shell; filling the space between the core and the outer shell with a plastic fire proof material practically a non-conductor of heat, allowing the material to set and adhere to the fibrous shell becoming rigid thereto; removing the core therefrom; sawing the tubular covering in two longitudinally, and attaching a canvas hinge and flap thereto, substantially as described.

4. A covering for steam pipes and the like, the same comprising an outer body of wool felt, and a lining or inner body of permanently adherent composition material consisting of asbestos fiber, asbestos pulp, dextrine, and calcined plaster, as described.

In testimony whereof I affix my signature in presence of two witnesses.

CHARLES B. MANVILLE.

Witnesses:
C. T. BENEDICT.
A. L. MORSELL.